Nov. 1, 1960  H. BLACKSTONE  2,958,253
ABSOLUTE-ALTITUDE METER
Filed April 21, 1955
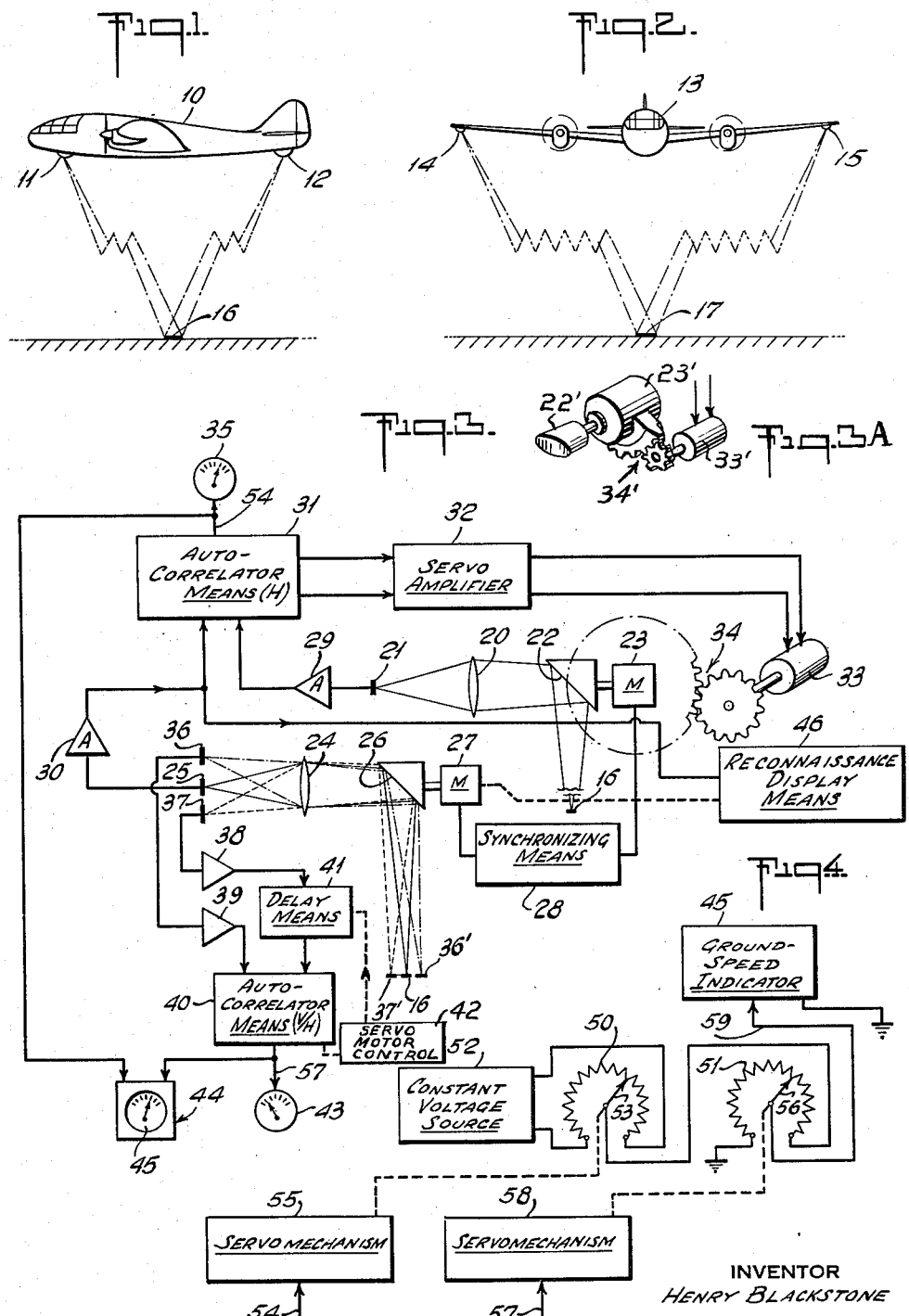
INVENTOR
HENRY BLACKSTONE
BY *Mitchell & Bechert*
ATTORNEYS United States Patent Office
2,958,253
Patented Nov. 1, 1960

2,958,253
ABSOLUTE-ALTITUDE METER
Henry Blackstone, Northport, N.Y., assignor to Servo Corporation of America, New Hyde Park, N.Y., a corporation of New York
Filed Apr. 21, 1955, Ser. No. 502,998
19 Claims. (Cl. 88—1)

My invention relates to an airborne absolute altimeter and is particularly concerned with means not requiring active radiation from the aircraft in order to derive absolute-altitude or ground-clearance data. This invention incorporates improvements and modifications with respect to the invention disclosed in my copending application, Serial No. 487,359, filed February 10, 1955, and now Patent Number 2,882,783.

It is an object of the invention to provide an improved device of the character indicated.

It is another object to provide a totally passive absolute altimeter.

It is also an object to meet the above objects with a device capable of night-time operation.

It is a general object to achieve the above objects with relatively compact structure which may be, and preferably is, also part of other equipment required by the aircraft, as for example part of reconnaissance-data-recording equipment of the type described in copending patent application, Serial No. 320,272, filed November 13, 1952, in the names of Henry Blackstone and Frank G. Willey.

It is a further object to provide an entirely passive ground-speed indicator utilizing absolute-altitude-responsive means of the invention.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Figs. 1 and 2 are simple diagrams representing fragmentary side and front views of an aircraft flying over terrain scanned by equipments of my invention, the installation of Fig. 2 representing an alternative to the installation of Fig. 1;

Fig. 3 is a view schematically indicating mechanical, optical and electronic components of a scanner and computer incorporating features of the invention;

Fig. 3A is a perspective view of a mechanism for correcting for roll of the aircraft; and Fig. 4 is an electrical block diagram of a component illustrated in Fig. 3.

Briefly stated, my invention contemplates an entirely passive absolute altimeter which is basically a triangulating mechanism utilizing two spaced passive scanners carried by the aircraft. The scanners need not be spaced in any particular relation to the flight axis, but they are preferably spaced generally in a horizontal plane and to the maximum extent convenient. Thus, with reference to Fig. 1, the scanners carried by the aircraft 10 may be located in fore and aft blisters 11—12, respectively, and for the alternative represented in Fig. 2, the scanners carried by the aircraft 13 may be located near the extremities of the wing, at blisters 14—15.

Detecting equipment at the respective spaced blisters 11—12 or 14—15, as the case may be, may incorporate energy-responsive elements and optical means imaging these elements on the ground over which the aircraft is flying. The optical response for one element is preferably trainable in elevation within a plane including the response of the other element, and correlating means responsive simultaneously to the video outputs of both energy-responsive elements may (at correlation) provide a means for acquiring the basic angles needed for determining absolute altitude by triangulation. By interconnecting the elevation-training mechanism and an autocorrelating mechanism, absolute-altitude data may be automatically derived and, therefore, continuously available.

My absolute altimeter lends itself to combination with other types of scanners so that duplication of equipment is avoided. Thus, one of the scanners of the absolute altimeter may also perform scanning functions to derive the velocity-altitude function of the aircraft, as disclosed in greater detail in my said copending application Serial No. 487,359, and now Patent Number 2,882,783. Alternatively, or additionally, one of the scanners may serve the function of deriving reconnaissance data as disclosed in said copending application Serial No. 320,272. When combined with velocity-altitude-responsive means, my invention lends itself, by provision of simple computer mechanism, to the passive derivation of ground-speed data.

Referring to the drawings, the basic absolute-altimeter feature of my invention lends itself flexibly to fore-aft and wing-tip installations, as suggested by the alternatives of Figs. 1 and 2. In either event, the separate energy-responsive elements at the spaced locations (and the optics associated therewith) may be of the relatively fixed variety, so that scanning action is achieved by virtue of aircraft motion alone and not by virtue of optical movement. In that event, each optical system images the energy-responsive element associated therewith at a spot on the ground, such as the spot 16 in Fig. 1 or the spot 17 in Fig. 2, and, upon making the tracking adjustment necessary to achieve correlation, the separate responses of the two detector systems are trained on the same ground image spots.

While my invention may be applicable to fixed optical systems, i.e. non-scanning optical systems, I hereby indicate my preference for the employment of scanning systems as of the type illustrated in Fig. 3. In the case of the system installed, say, at blister 12, the optics may include a relatively fixed lens 20 imaging the energy-responsive element or cell 21 on the ground by way of an inclined reflector surface 22, the surface 22 being continuously driven by motor means 23 so as periodically to sweep laterally of the flight axis of the aircraft. Thus, the ground-image spot 16 in Fig. 1 may be caused successively to traverse the flight axis. Similarly, at the spaced blister 11, a second scanning system may include fixed optics 24 imaging the cell 25 on the ground by way of an inclined reflector 26 continuously driven by motor means 27. Synchronizing means 28 assures locked-in rotation of the two motors 23—27.

The video outputs of the two cells 21—25 may be amplified as needed at 29—30 and fed to correlating means 31 which may be of the type disclosed in said application Serial No. 487,359, and now Patent Number 2,882,783, but which is preferably of the auto-correlating variety, as of the type disclosed in application Serial No. 444,990, filed July 22, 1954, and now Patent Number 2,878,711. By auto-correlating, I mean that the means 31 includes provision for developing suitable error signals responsive to lack of optimum correlation and for suitably effecting correction such as a mechanical rotation or other displacement, in order to produce optimized correlation. The autocorrelation means 31 may thus yield a polarized error-signal output, as schematically suggested by connection to servo amplifier 32, and the amplifier 32 may in turn control a reversible motor 33 in pitch-controlling relation with one of the optical systems, such as the scanner 22 in blister 12.

Since I have been describing Fig. 3 with particular reference to the fore-aft blister arrangement of Fig. 1, the pitch displacement effected by means 33—34 is such as bodily to displace the assembly of motor 23 and mirror 22, in the sense of pitch of the aircraft, that is, in a plane substantially common to the forward scanner at blister 11, and to its vertical plane of symmetry. For wing-tip installations, as depicted in Fig. 2, the elevation-training mechanism 33—34 will be understood effectively to precess the base of the motor 23 about its own axis, i.e. in the roll sense of the aircraft. In either event, the amount of tracking correction necessary to achieve correlation may be displayed, as at the indicator 35, and the displayed indication may be direct-reading in terms of absolute altitude (H).

The ray or response relationships depicted in Figs. 1 and 2 will be understood to be purely schematic. The desired triangulation may be achieved by pitch control of both scanners, or, as described, by holding one scanner to a fixed pitch while adjusting the pitch of the other in accordance with the output of the autocorrelator. In the latter event, a nominal vertical response (or vertical-plane response) of the fixed-pitch scanner is to be preferred, in spite of the pitch-depressed responses shown in the drawings for both scanners in both Figs. 1 and 2.

As indicated generally above, the velocity-altitude-responsive means may utilize optics in common with absolute-altitude-responsive means and, in the form shown, the single optical means 24—26 serves both purposes. Thus, in order to derive video signals from which velocity-altitude observations are made, I may employ two further cell elements 36—37 in the focal surface of optics 24 and so placed on opposite sides of cell element 25 that the images of elements 36—37 are always spaced on the ground in the sense of the flight axis. This is suggested in Fig. 3 by image spots 36'—37' representing, respectively, the leading and trailing responses derived by cells 36—37.

The outputs of cells 36—37 may be suitably preamplified at 38—39 and applied to correlating means in the manner described at greater length in my copending patent application Serial No. 480,436, filed January 7, 1955, and now patent number 2,878,713. Thus, the connection of the video output of the lead cell 37 to the correlator 40 may include delay means 41 having an adjustable control element or connection 42, the condition of which will (at correlation) reflect the velocity-altitude (V/H) function of the aircraft. I suggest by connection of the means 42, between the correlator 40 and the delay means 41, that means contained within the correlator 40 and responsive to lack of correlation may directionally control the setting of delay means 41 until correlation is optimized, thus providing automatic adjustment of correlation. The setting at which correlation is achieved may be directly viewed, as on a meter 43, which may be calibrated for direct-reading in terms of the velocity-altitude (V/H) function. Further means 44 may include a computer, whereby the product of the altitude (H) and of the velocity-altitude (V/H) signals fed to meters 35—43 is derived and displayed; the display at 45 may thus be direct-reading in terms of ground speed.

The computer 44 may be one of a variety of forms, and in Fig. 4, I illustrate suitable means for deriving the product of the two correlator settings. Essentially, the computer of Fig. 4 comprises first and second potentiometers 50—51. The first potentiometer is connected across a source 52 of constant voltage, and includes a pick-off element 53 positioned in accordance with instantaneous setting of the absolute-altitude (H) correlator 31, this setting being available as an electrical signal in the line 54 to the indicator 35 and to a suitable servomechanism 55 for actuating the pick-off 53. The second potentiometer is connected across the picked-off voltage output of the first potentiometer 50 and thus may serve to multiply the absolute-altitude voltage. The pick-off element 56 of the second potentiometer 51 may be directly controlled by the V/H signal supplied in line 57 to the meter 43 and to another suitable servomechanism 58 for actuating the pick-off 56. The output of the second potentiometer in line 59 is a voltage directly reflecting the computed product, namely, absolute altitude (H), multiplied by V/H or ground speed, and may directly control the indicator for display means 45.

It will be seen that I have described ingenious and relatively simple means for continuously and automatically indicating absolute altitude. My device may be operated in conjunction with existing devices for deriving ground speed and/or V/H data, and the device lends itself to entirely passive operation. By employing suitable infrared-responsive cells (such as thermistor flakes) at 21—25—36—37, and by employing infrared-transmitting optics 20—24, the device may be equally effective for night-time operation. At 46, I suggest a conventional reconnaissance display means functioning from the scanner 20—22, as in the manner disclosed in said Blackstone-Willey application, Serial No. 320,272. This further suggests how my absolute altimeter and ground-speed indicator may utilize components already in the aircraft.

While I have described the invention in detail for the preferred forms shown, it will be understood that modifications may be made within the scope of the invention as defined in the claims which follow.

I claim:

1. An absolute altimeter, comprising two energy-responsive elements fixedly mounted at spaced locations on a carrying aircraft, optical means associated with each of said elements for imaging said elements on the ground, means associated with one of said means for training the same in elevation in substantially the plane including the optical axis associated with the other element, correlator means responsive to the separate video outputs of said cells, and computer means responsive to the base separation between said elements and to the trained angle of elevation of said one optical system upon achievement of correlation between video signals, whereby absolute altitude is directly derived from the adjustment necessary to achieve correlation.

2. A device according to claim 1, in which said elements are located, respectively, substantially at the forward and aft limits of the aircraft.

3. A device according to claim 1, in which said elements are located, respectively, substantially at the wing-tip limits of the aircraft.

4. A device according to claim 1, in which said optical systems are relatively fixed and therefore in and of themselves do not cause scanning action in the cells associated therewith.

5. A device according to claim 1, in which said optical elements are movably mounted to cause images of the cells associated therewith to scan generally transversely of the flight axis of the aircraft, and means synchronizing scanning action of said optical elements.

6. An airborne ground-speed meter, comprising velocity-altitude means including an optical device scanning earthbound objects beneath the aircraft and responsive to the velocity-altitude function of the aircraft, altitude-responsive means responsive to the absolute altitude of the aircraft, and computer means responsive to the product of the outputs of said velocity-altitude means and of said absolute-altitude means.

7. An airborne ground-speed meter, comprising velocity-altitude-responsive means, including separate lead and trailing elements responsive to ground-scanned radiation and carried at two locations longitudinally spaced with respect to the flight axis, correlating means including means for delaying the output of the lead element with respect to that of the trailing element, whereby the measured delay may reflect the velocity-altitude function, absolute-altitude means responsive to the ground clearance of the aircraft, and computer means responsive to the product of said velocity-altitude-responsive means and of said altitude-responsive means.

8. An airborne ground-speed meter, comprising velocity-altitude-responsive means, absolute altitude-responsive means including two separate optical systems with associated energy-responsive elements at horizontally spaced locations on the aircraft and having downwardly directed responses, means for training one of said optical systems in elevation with respect to that of the other in the plane defined by said optical systems and by the axis of the other of said optical systems, correlating means responsive to the video outputs of said energy-responsive elements, whereby the training necessary to achieve correlation may directly reflect absolute altitude, and computer means responsive to the product of the training angle necessary to achieve correlation and the output of said velocity-altitude-responsive means.

9. An airborne ground-speed meter, comprising velocity-altitude-responsive means including two energy-responsive elements and optical means separately imaging said elements at spaced locations on the ground, said locations being spaced longitudinally with respect to the flight axis, correlating means including means for delaying the output of the lead element with respect to that of the trailing element, whereby, upon achieving correlation, the delay may directly reflect the velocity-altitude function; absolute altitude-responsive means including separate energy-responsive elements having downwardly directed responses, means for training the response of one of said elements in elevation in a plane including the response axis of the other of said elements, correlating means responsive to the outputs of said elements, whereby at correlation the training angle necessary to achieve correlation may directly reflect ground clearance; and computer means responsive to the product of the delay at said first-mentioned delay means and the adjustment necessary for correlation at said second-mentioned correlating means.

10. The combination of claim 9, in which said absolute-altimeter means includes separate optical systems for the elements thereof, one of said separate optical systems being in common with the optical system for said velocity-altitude-responsive means.

11. The combination of claim 9, in which the two energy-responsive elements of said velocity-altitude-responsive means are disposed longitudinally adjacent opposite sides of one of the energy-responsive elements of said absolute altitude-responsive means, whereby a single optical system may serve the energy-responsive element of said velocity-altitude-responsive means, as well as one of the energy-responsive elements of said absolute-altitude means.

12. An airborne ground-speed indicator, comprising absolute-altitude-responsive means, velocity-altitude-responsive means, a constant-voltage source, means including a potentiometer connected across said source and having a pick-off element positioned in response to the output of said velocity-altitude-responsive means, means including a second potentiometer connected across the pick-off voltage from said first potentiometer and including a pick-off element positioned in response to the output of said absolute altitude-responsive means, whereby the voltage developed by the pick-off for said second potentiometer may directly reflect ground speed.

13. The combination of claim 12, and including display means responsive to the pick-off voltage of said second potentiometer.

14. An airborne-reconniassance device, comprising an optical scanner including an energy-responsive element, and means for periodically causing the ground image of said element to traverse a scan line laterally of the flight axis, whereby a first scan-line video signal is developed, a second optical scanner including an energy-responsive element, and means for periodically causing the ground image thereof to traverse a scan line laterally of the flight axis, said scanners being spaced generally in a horizontal plane in the aircraft, two further energy-responsive elements in the focal surface of one of said scanners and so placed on opposite sides of the first-mentioned energy-responsive element thereof as to cause images thereof to scan longitudinally spaced scan lines on the ground, means for training one of said scanners in elevation and generally in a vertical plane including the other of said scanners, first correlation means responsive to said first two mentioned energy-responsive elements, whereby, upon training in elevation to achieve correlation, ground-clearance data are available, and second correlation means responsive to said two further energy-responsive elements and including means for delaying one video output with respect to the other, whereby said second correlation means may at correlation yield velocity-altitude data.

15. A device according to claim 14, and including computer means responsive to the product of the adjustments of both said correlation means.

16. An airborne-reconnaissance device, comprising an optical scanner including an energy-responsive element, and means for periodically causing the ground image of said element to traverse a scan line laterally of the flight axis, whereby a first scan-line video signal is developed, a second optical scanner including an energy-responsive element, and means for periodically causing the ground image thereof to traverse a scan line laterally of the flight axis, said scanners being spaced generally in a horizontal plane in the aircraft, means for training one of said scanners in elevation and generally in a vertical plane including the other of said scanners, and correlation means responsive to both said energy-responsive elements, whereby, upon training in elevation to achieve correlation, ground-clearance data are available.

17. A device according to claim 16, and including reconnaissance-display means responsive to the video output of one of said elements and synchronized with movement of the optical scanner associated therewith.

18. An airborne absolute altimeter, comprising an optical scanner including an energy-responsive element and means for periodically causing the ground image of said element to traverse a scan line laterally of the flight axis, whereby a first scan-line video signal is developed, a second optical scanner including an energy-responsive element and means for periodically causing the ground image thereof to traverse a scan line laterally of the flight axis, said scanners being longitudinally spaced generally in a horizontal plane in the aircraft, means continuously synchronizing the periodicity of said scanners, means for training one of said scanners in pitch, whereby the scan line for said scanner may be shifted in the fore-aft direction with respect to the aircraft, and correlation means responsive to both said energy-responsive elements, whereby, upon training in elevation to achieve correlation, absolute-altitude data are available.

19. An airborne absolute altimeter, comprising an optical scanner including an energy-responsive element and means for periodically causing the ground image of said element to traverse a scan line laterally of the flight axis, whereby a first scan-line video signal is developed, a second optical scanner including an energy-responsive element and means for periodically causing the ground image thereof to traverse a scan line laterally of the flight axis, said scanners being laterally spaced generally in a horizontal plane in the aircraft and oriented so that they scan on the same lateral axis, means continuously synchronizing the periodicity of said scanners, means for training one of said scanners in roll, whereby the scan line for said scanner may be shifted along said lateral axis with respect to the scan line for the other scanner, and correlation means responsive to both said energy-responsive elements, whereby, upon training in roll to achieve correlation, absolute-altitude data are available.

References Cited in the file of this patent

UNITED STATES PATENTS

| | | |
|---|---|---|
| 2,315,756 | Warner | Apr. 6, 1943 |
| 2,318,153 | Gilson | May 4, 1943 |
| 2,524,807 | Kallman | Oct. 10, 1950 |
| 2,550,603 | Russell | Apr. 24, 1951 |